US005626438A

United States Patent [19]

Etheridge

[11] Patent Number: 5,626,438

[45] Date of Patent: May 6, 1997

[54] SYSTEM FOR EXCAVATING AND REHABILITATING UNDERGROUND PIPELINES

[75] Inventor: Thomas J. Etheridge, Columbus, Tex.

[73] Assignee: Pipeline Rehab, Inc., Columbus, Tex.

[21] Appl. No.: 621,903

[22] Filed: Mar. 26, 1996

Related U.S. Application Data

[63] Continuation of Ser. No. 126,223, Sep. 24, 1993, abandoned, which is a continuation-in-part of Ser. No. 62,953, Jan. 15, 1993, Pat. No. 5,359,748, and Ser. No. 60,619, May 14, 1993, abandoned.

[51] Int. Cl.[6] .......... F16L 1/00

[52] U.S. Cl. .......... 405/154; 15/104.04; 73/49.1; 324/262; 405/158; 405/163

[58] Field of Search .......... 405/163, 164, 405/158, 154, 157, 172; 324/262, 225, 242, 243, 207.11, 237, 238, 240; 73/866.5, 49.1; 166/337, 336; 15/104.04, 104.03, 93.1

[56] References Cited

U.S. PATENT DOCUMENTS

| | | | |
|---|---|---|---|
| 2,882,488 | 4/1959 | Price et al. | 324/225 |
| 2,980,850 | 4/1961 | Cochran | 324/242 |
| 3,333,432 | 8/1967 | Hale et al. | 405/164 |
| 3,429,131 | 2/1969 | Martin . | |
| 3,978,679 | 9/1976 | Lecomte . | |
| 3,995,439 | 12/1976 | Hahlbrock . | |
| 4,022,028 | 5/1977 | Martin . | |
| 4,258,319 | 3/1981 | Shimada et al. | 324/242 |
| 4,301,606 | 11/1981 | Hofmeester . | |
| 4,389,139 | 6/1983 | Norman . | |
| 4,395,158 | 7/1983 | Brooks . | |
| 4,479,741 | 10/1984 | Berti et al. | 405/163 |
| 4,546,316 | 10/1985 | Lang | 324/262 |
| 4,586,850 | 5/1986 | Norman et al. | 405/163 |
| 4,641,092 | 2/1987 | Sakamoto et al. | 324/243 |
| 4,714,381 | 12/1987 | Hatch . | |
| 4,802,793 | 2/1989 | Grinsted et al. . | |
| 4,880,335 | 11/1989 | Lee | 405/158 |
| 4,912,799 | 4/1990 | Coleman | 15/104.04 |
| 4,936,707 | 6/1990 | Shishkin et al. . | |
| 5,136,969 | 8/1992 | Chapman . | |
| 5,182,941 | 2/1993 | Frenkel et al. | 73/49.1 X |
| 5,238,331 | 8/1993 | Chapman | 405/158 X |
| 5,321,356 | 6/1994 | Weischedel | 324/262 |
| 5,359,748 | 11/1994 | Etheridge . | |

FOREIGN PATENT DOCUMENTS

| | | | |
|---|---|---|---|
| 1517096 | 7/1978 | United Kingdom | 324/262 |

OTHER PUBLICATIONS

Ser. No. 08/126,223 filed Sep. 24, 1993; Thomas J. Etheridge.

Ser. No. 08/060,619 filed May 14, 1993; Thomas J. Etheridge (abandoned).

*Primary Examiner*—Dennis L. Taylor
*Attorney, Agent, or Firm*—Merek & Voorhees

[57] ABSTRACT

A system for excavating and rehabilitating underground pipelines. The system including an earth removal unit, a coating removal unit and a defect detection unit each of which is self-propelled to ride on and/or along underground pipelines. The earth removal unit includes an adjustable housing adapted to be mounted about an exposed portion of the underground pipeline. The earth removal unit further includes front and rear wheel assemblies adapted to engage the top surface of the underground pipeline. A plurality of endless belts are suspended from the housing so that they assume a position beneath the underground pipeline. The endless belts are independently operable and include a plurality of cutting/digging elements. The endless belts are offset in both the horizontal and vertical directions with respect to the underground pipeline. The coating removal unit includes at least one endless chain for removing the deteriorated coating on the underground pipeline. The defect detection unit automatically detects defects in the exterior surface of the underground pipeline as it is moving therealong.

20 Claims, 8 Drawing Sheets

SYSTEM FOR EXCAVATING AND REHABILITATING UNDERGROUND PIPELINES

CROSS-REFERENCE TO RELATED U.S. PATENT APPLICATIONS

This application is a continuation of application Ser. No. 08/126,223, filed on Sep. 24, 1993, now abandoned, which is a continuation in part of 08/062,953, filed Jan. 15, 1993, now U.S. Pat. No. 5,359,748, and a continuation in part of application Ser. No. 08/060,619, filed May 14, 1993, now abandoned.

FIELD OF INVENTION

The present invention is directed to a system for excavating and rehabilitating underground pipelines.

BACKGROUND OF THE INVENTION

Underground pipelines are commonly used throughout the world to transport various materials from one location to another. Conventionally, the pipes which eventually form the pipeline system are provided with a protective coating at some point prior to burial. This protective coating deteriorates over time thereby necessitating the removal of the deteriorated coating and application of a new protective coating to prevent the pipeline from being damaged.

A variety of methods and devices have been proposed and implemented for excavating an underground pipeline and refurbishing the deteriorated coating formed thereon. The conventional manner for excavating the underground pipeline is through the use of a backhoe. This manner of unearthing an underground pipeline has a number of drawbacks. Specifically, during the unearthing process, the backhoe is likely to strike the pipeline thereby damaging the same. Further, it is especially difficult and time consuming to clear the earth from underneath the underground pipeline so that a coating removal device may ride freely on the pipeline.

Similarly, once the underground pipeline has been unearthed, conventional techniques for removing the deteriorated coating therefrom have been fraught with design flaws which sacrifice economies of time, labor and money. Known techniques for removing deteriorated coating include assemblies which use spring loaded knife blades connected to a rotating ring driven concentrically around the pipe. This system is disadvantageous in that, once the coal-tar coatings become pliable, they tend to build up on the knife blades rendering the blades incapable of effectively removing deteriorated coating. This in turn results in significant delays, while the knife blades are cleaned. Still other systems have required the pipeline to be removed from the burial ditch prior to removal of the protective coating.

Upon excavating the underground pipeline and removing the deteriorated protective coating, the exterior surface of the pipeline must be examined to determine if the pipeline was damaged during either process or became damaged prior thereto. Known methods for examining the pipeline are extremely antiquated and inefficient. Commonly, the inspection is performed by individuals visually examining the external surface of the pipeline. Mirrors are used so that individuals can see the lower sections of the pipeline. It will be readily appreciated that visual inspection is extremely unreliable and expensive.

OBJECTS AND SUMMARY OF PREFERRED EMBODIMENT OF THE PRESENT INVENTION

An object of the preferred embodiment of the present invention is to provide a novel and unobvious system for excavating and rehabilitating underground pipelines which overcomes the above-identified disadvantages of the prior art.

Another object of the preferred embodiment of the present invention is to provide a system for excavating and rehabilitating underground pipelines which substantially reduces the need for a backhoe to unearth the same.

A further object of the preferred embodiment of the present invention is to provide a system for excavating and rehabilitating underground pipelines including an earth removal unit which rests on and rides along the underground pipeline to remove earth surrounding the same.

Yet another object of the present invention is to provide a system for excavating and rehabilitating underground pipelines including an earth removal unit which can be readily adjusted to operate on different sizes of underground pipelines.

Still a further object of the preferred embodiment of the present invention is to provide a system for excavating and rehabilitating underground pipelines including an earth removal unit having a protective plate or shroud to prevent damage to the underground pipeline as it is being unearthed.

Yet still another object of the preferred embodiment of the present invention is to provide a system for excavating and rehabilitating pipelines including an earth removal unit having a plurality of independently operable endless belts.

Yet still a further object of the preferred embodiment of the present invention is to provide a system for excavating and rehabilitating pipelines including an earth removal unit, a coating removal unit and a defect detection unit which are all self-propelled and are mounted on and/or ride along the pipeline.

In summary, the preferred embodiment of the present invention is directed to a system for excavating and rehabilitating underground pipelines. The system includes an earth removal unit, a coating removal unit and a defect detection unit each of which is self-propelled to ride on and along underground pipelines. The earth removal unit includes an adjustable housing adapted to be mounted about an exposed portion of the underground pipeline. The earth removal unit further includes front and rear wheel assemblies adapted to engage the top surface of the underground pipeline. A plurality of endless belts are suspended from the housing so that they assume a position beneath the underground pipeline. The endless belts are independently operable and include a plurality of cutting/digging elements. The endless belts are offset in both the horizontal and vertical directions with respect to the underground pipeline. The coating removal unit includes at least one endless chain for removing the deteriorated coating on the underground pipeline. The defect detection unit automatically detects defects in the exterior surface of the underground pipeline as it is moving therealong.

DETAILED DESCRIPTION OF THE DRAWINGS

DETAILED DESCRIPTION OF THE PREFERRED EMBODIMENT OF THE PRESENT INVENTION

The preferred embodiment of the present invention will now be described with reference to FIG. 1 to 14.

FIGS. 1–5

Figure 1:
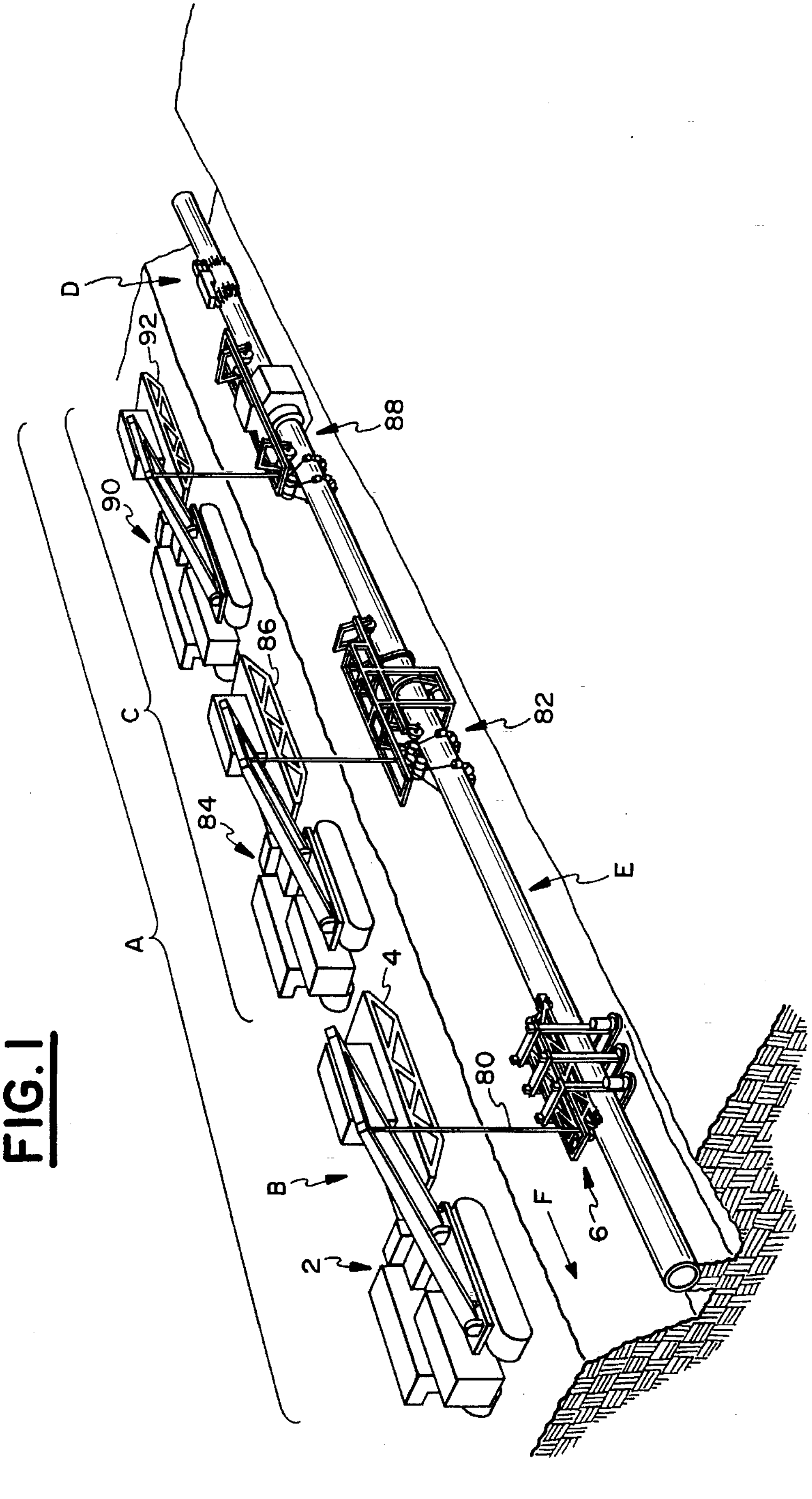
FIG. 1 is a perspective view of a preferred form of a system for excavating and rehabilitating underground pipelines.
Figure 4:
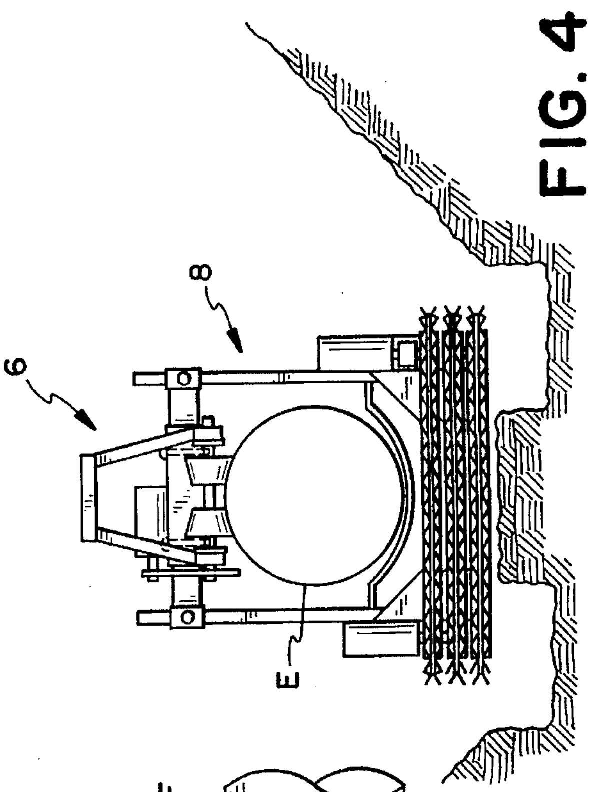
FIG. 4 is a rear elevational view of the preferred form of an earth removal unit.

Referring to FIG. 1, a system A for excavating and rehabilitating underground pipelines includes an earth removal unit B, a protective coating removal unit C, and a defect detection unit D. The earth removal unit B, protective coating removal unit C and defect detection unit D are mounted about and preferably supported on the pipeline E.

The earth removal unit B includes a side boom tractor 2, an associated skid or trailer 4 connected to tractor 2 and an excavating device 6. Referring to FIGS. 2 to 5, the excavating device 6 includes a housing or frame 8, a front wheel assembly 10, a rear wheel assembly 12, excavating members 14, 16 and 18 and a shroud 20. Each assembly 10 and 12 includes a pair of wheels 21. It will be appreciated that one or more wheels 21 will be used.

A drive motor 22 is connected to rear wheel assembly 12 via drive belt 24. It will be readily appreciated that front wheel assembly 10 may be driven in addition to or instead of rear wheel assembly 12. The power source for drive motor 22 is carried by skid 4. The power source and drive motor 22 are connected in a conventional manner.

Figure 3:
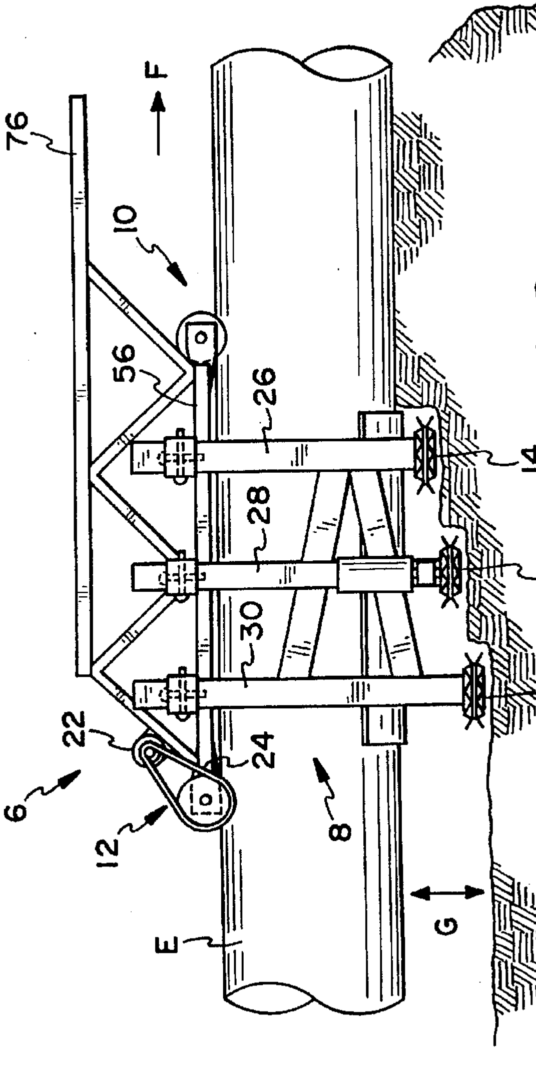
FIG. 3 is a side elevational view of the preferred form of an earth removal unit.

Referring to FIG. 3, housing 8 includes three substantially rectangular frame elements 26, 28 and 30. Frame elements 26, 28 and 30 are substantially identical in configuration and therefore the details of only frame element 26 have been shown in the drawings (i.e. FIG. 5).

Figure 5:
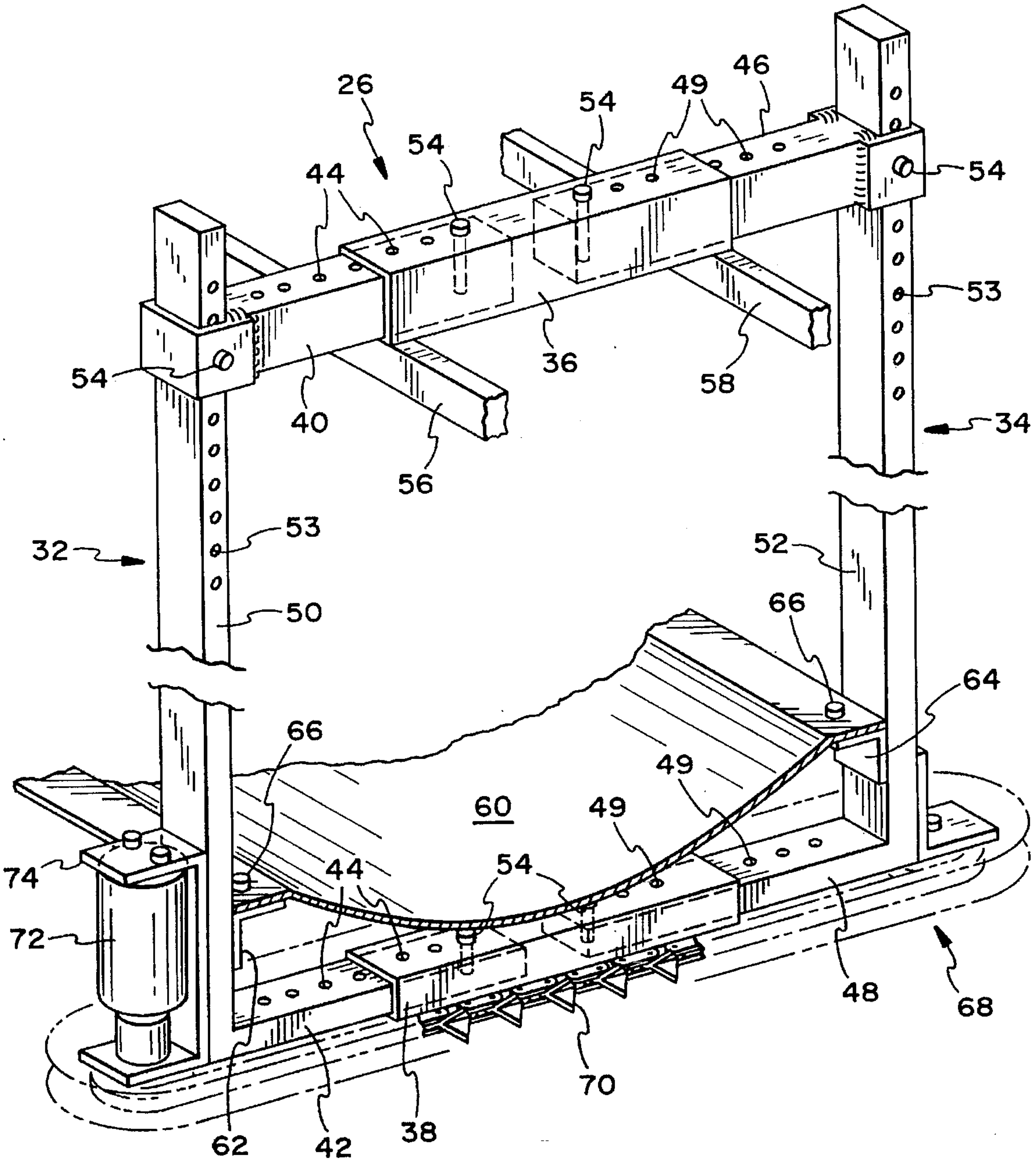
FIG. 5 is a fragmentary perspective view of the preferred form of an earth removal unit.

Turning now to FIG. 5, frame element 26 includes left side support 32, right side support 34, upper center section 36 and lower center section 38. As is readily evident from FIG. 5, inwardly extending arms 40 and 42 of side support 32 are received in the left ends of center sections 36 and 38, respectively. Arms 40 and 42 as well as the left ends of center sections 36 and 38 include a plurality of openings 44 for permitting horizontal adjustment of left side support 32. Similarly, inwardly extending arms 46 and 48 of right side support 34 are received in the right ends of center sections 40 and 42, respectively. Arms 46 and 48 as well as the right ends of center sections 36 and 38 include a plurality of openings 49 to permit horizontal adjustment of side support 34.

Vertically extending members 50 and 52 of side supports 32 and 34, respectively include a plurality of openings 53 for permitting vertical adjustment of arms 40 and 46. Removable pins 54 maintain the frame element 26 at a desired size.

Horizontally extending support members 56 and 58 are secured to upper center section 36. As is readily seen in FIG. 3, support members 56 and 58 rotatably support wheel assemblies 10 and 12.

A shroud 60 is supported by L-shaped brackets 62 and 64 between members 50 and 52. Shroud 60 is removably secured to brackets 62 and 64 via pins 66 or other suitable fasteners. It will be readily appreciated that a different size protective shroud is to be installed as the width of frame element 26 is varied. Alternatively, shroud 60 could be made adjustable to accommodate the various different widths of frame element 26.

An endless belt 68 is suspended from the lower portion of frame 26. The endless belt 68 includes a plurality of cutting/digging elements 70. Preferably, the endless belt 68 is adjustable to accommodate the varying widths of frame 26.

A drive motor 72 is secured to left side support 32 by a U-shaped bracket 74. The drive shaft (not shown) of drive motor 70 extends through the lowermost portion of bracket 74 to engage and drive endless belt 68. Preferably, excavating members 14 and 18 are driven in opposite directions to reduce the rotational forces on excavating device 6. The power sources for each of the drive motors for excavating members 14, 16 and 18 are carried on skid 4. The power sources and drive motors are connected in a conventional manner.

Figure 2:
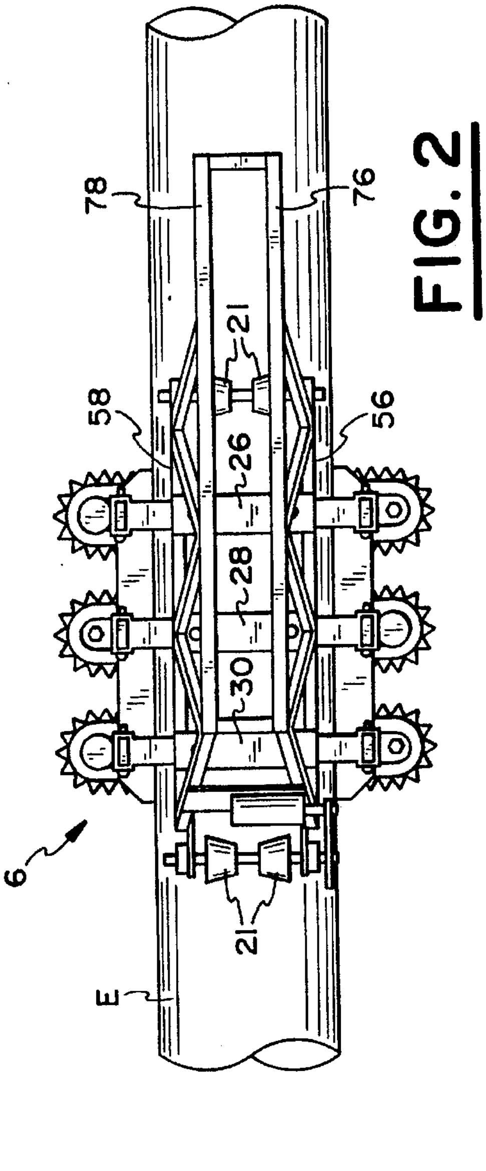
FIG. 2 is a plan view of a preferred form of an earth removal unit.

Referring to FIGS. 2 and 3, the uppermost section of frame 8 includes horizontally extending columns 76 and 78. The columns 76 and 78 are spaced a sufficient distance apart to receive guide 80 extending from tractor 2. Guide 80 prevents the excavating device 6 from rotating on the underground pipeline E.

FIGS. 6 TO 8

The coating removal unit C includes a self-propelled carriage assembly 82 and a corresponding side boom tractor 84 and skid 86.

A sling assembly 94 is positioned about the pipeline E and suspended by a side boom tractor 84. In this manner, the section of the pipeline E immediately adjacent the carriage assembly 82 is disposed above the ground a sufficient distance to enable the carriage assembly to move freely therealong. More specifically, the sling assembly 94 maintains the adjacent section of pipeline E at the height prior to removal of the underlying earth by the excavator 6.

Figure 6:
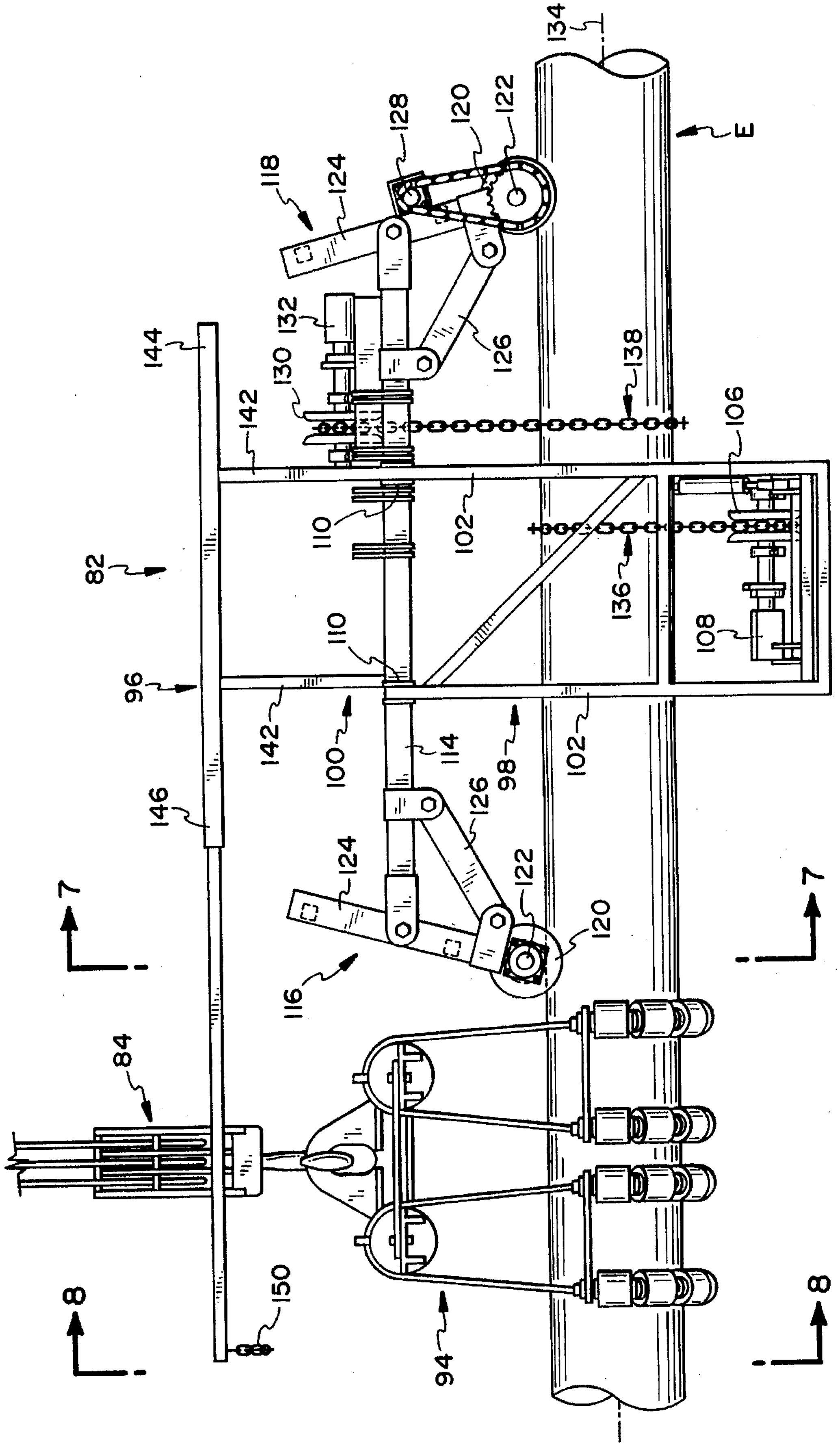
FIG. 6 is a side elevational view of one element of a coating removal unit formed in accordance with the preferred embodiment of the present invention.
Figure 7:
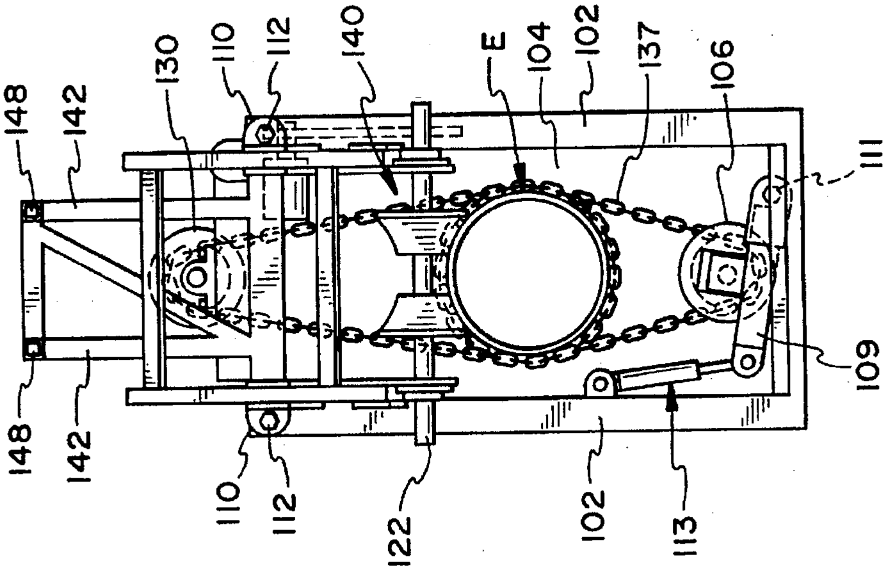
FIG. 7 is a cross section-sectional view taken along lines; 7—7 of FIG. 6.

The carriage assembly 82 includes a frame 96 having a lower section 98 detachably connected to an upper section 100. Referring to FIGS. 6 and 7, the lower section 98 includes four vertically extending columns 102. The columns 102 are spaced from each other a sufficient distance to form opening 104 to receive the pipeline E.

Referring to FIG. 7, a drive sprocket or pulley 106, and drive motor 108 are supported on an adjustable platform 109 secured to and extending between vertical columns 102.

Referring to FIG. 7, the platform 109 is pivotally mounted about shaft 111. A piston and cylinder arrangement 113, is connected to platform 109, for varying the distance between platform 109 and pipeline E. The drive motor 108 is drivingly connected to the drive pulley or sprocket 106. Preferably, the drive motor 108 is a hydraulic motor. However, any conventional drive motor may be used.

Openings are formed in the uppermost portion of columns 102 and are of a size corresponding to the openings formed in brackets 110 extending from the upper section 100 of the frame 96. Pins 112 pass through the openings formed in the uppermost portion of columns 102 and brackets 110 to detachably connect the lower section 98 to the upper section 100 of the frame 96. By forming frame 96 from a lower section 98 which is detachable from the upper section 100, it is possible to readily mount the carriage assembly 82 on pipeline E. More specifically, as seen in FIG. 7, the lower section 98 is substantially U-shaped. The lower section 98 is fitted about the pipeline E by first inverting it such that the open end of the U-shaped sub-assembly receives the pipeline E. Subsequently, the lower section 98 or sub-assembly is rotated to the position shown in FIG. 6. The upper section 100 of the frame 96 is then mounted to the pipeline E and detachably connected to the lower section 98 by pins 112.

Upper section 100 of frame 96 includes a pair of horizontally extending arms 114. As is seen in FIGS. 6 and 7, brackets 110 are secured to and extend outwardly from arms 114. Wheel assemblies 116 and 118 are secured to opposite ends of arms 114, as seen in FIG. 6. Referring to FIG. 7, wheel assemblies 116 and 118 include a pair of rollers 120 which are adapted to run along the upper surface of the pipeline E. Adjustable collars or other suitable members may be used with rollers 120 mounted on a shaft 122 so that the spacing between the rollers 120 may be varied to accommodate different size pipes. Shafts 122 are supported by substantially rectangularly shaped support members 124 and associated braces 126.

A drive motor 128 is drivingly connected to shaft 122 to drive the rollers 120 mounted thereon. In this manner, the carriage assembly 82 may be self-propelled along the pipeline E. It will be understood that a drive motor could be attached to wheel assembly 118 or to wheel assembly 116.

A second drive sprocket or pulley 130 and corresponding drive motor 132 are mounted on the upper section of frame 96 between arms 114. The drive motor 132 is preferably a hydraulic motor. However, any suitable drive motor may be used. Referring to FIG. 6, drive pulley 130 is offset from drive pulley 106 along the longitudinal axis 134 of pipeline E.

A first endless flexible member 136 such as a chain passes under drive sprocket or pulley 106 and over the top surface of pipeline E. In this manner, the endless chain 136 forms a loop 137 which engages the upper and side surfaces of pipeline E. A second endless chain 138 passes over drive pulley or sprocket 130 and under the pipeline E. Thus, the second endless chain 138 forms a loop 140 which engages the bottom and side surfaces of the pipeline E. Therefore, the first loop 137 cleans the upper half of the pipeline while the second loop 140 cleans the lower half. As is seen in FIG. 6, the second loop 140 is offset along the longitudinal axis from the first loop 137. This arrangement prevents interference between the flexible members 136 and 138.

The drive motors 108 and 132 drive endless chains 136 and 138 at a high speed through closed paths about the exterior surface of the pipeline E. Since drive motors 108 and 132 are operable independent of each other, the speeds of chains 136 and 138 may be varied relative to each other if desired. The endless chains 136 and 138 do not experience build-up of protective coating thereon. This is due in part to the centrifugal force generated during travel of the chains 136 and 138 which frees any protective coating initially adhered thereto. This is also due to the flexing of the chains as they pass through the corresponding drive pulleys 106 and 140.

A hydraulic piston and cylinder assembly (not shown) is also associated with the drive pulley 130 to vary the distance of the pulley 130 relative to the pipeline E. Since the hydraulic piston and cylinder assemblies for pulleys 106 and 130 are operable independent of each other, it is possible to independently adjust the tension of loops 138 and 140.

The endless chains 136 and 138 are formed by master links. By using endless chains, each link at some point engages the outer surface of the pipeline E to remove the deteriorated coating formed thereon.

Four support columns 142 extend upwardly from arms 114 and are secured to the respective horizontally extending members 144. The members 144 are hollow and each have an opening formed at ends 146. Square tubing 148 is received in the ends 146. A chain 150 extends between the ends 152 of square tubing 148.

Figure 8:
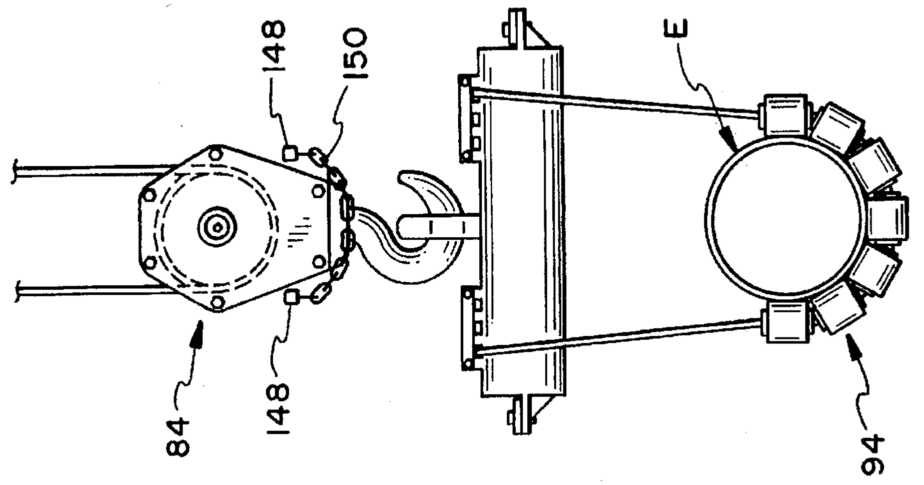
FIG. 8 is a cross-sectional view taken along lines 8—8 of FIG. 6.

Referring to FIG. 8, the square tubing 148 prevents the side boom 84 from moving laterally with respect to the carriage assembly 82. The chain 150 ensures that the side boom 84 stays between the square tubing 148. The coating removal unit C further includes a self-propelled grit blaster 88 and corresponding side boom tractor 90 and skid 92. The carriage assembly 82 and grit blaster 88 act to remove the deteriorated protective coating as well as prepare the exterior surface to receive a new protective coating. The details of the grit blaster 84 are described in U.S. Pat. No. 5,056,271 which is incorporated herein by reference in its entirety. The defect detection unit D is mounted on the pipeline E rearwardly of grit blaster 88. The defect detection unit D monitors the exterior surface of the pipeline E to determine if any defects exist therein prior to application of a new protective coating.

FIGS. 9–14

Figure 9:
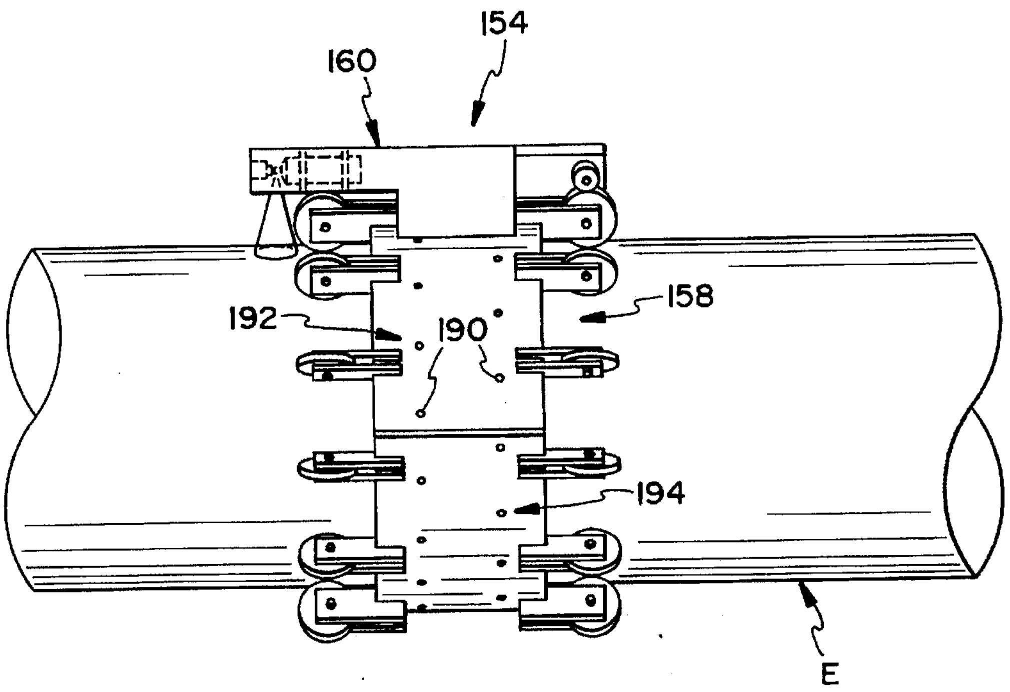
FIG. 9 is a side elevational view of one element of a defect detection unit formed in accordance with the preferred embodiment of the present invention.

Referring to FIG. 9, the defect detection unit includes a self-propelled carriage assembly 154 mounted on the exterior surface of a section of pipeline E.

The carriage assembly 154 includes a substantially annular frame 158 mounted about the entire outer periphery of a section of the pipeline E. A marking unit 160 is mounted on top of the frame 158.

Figure 14:
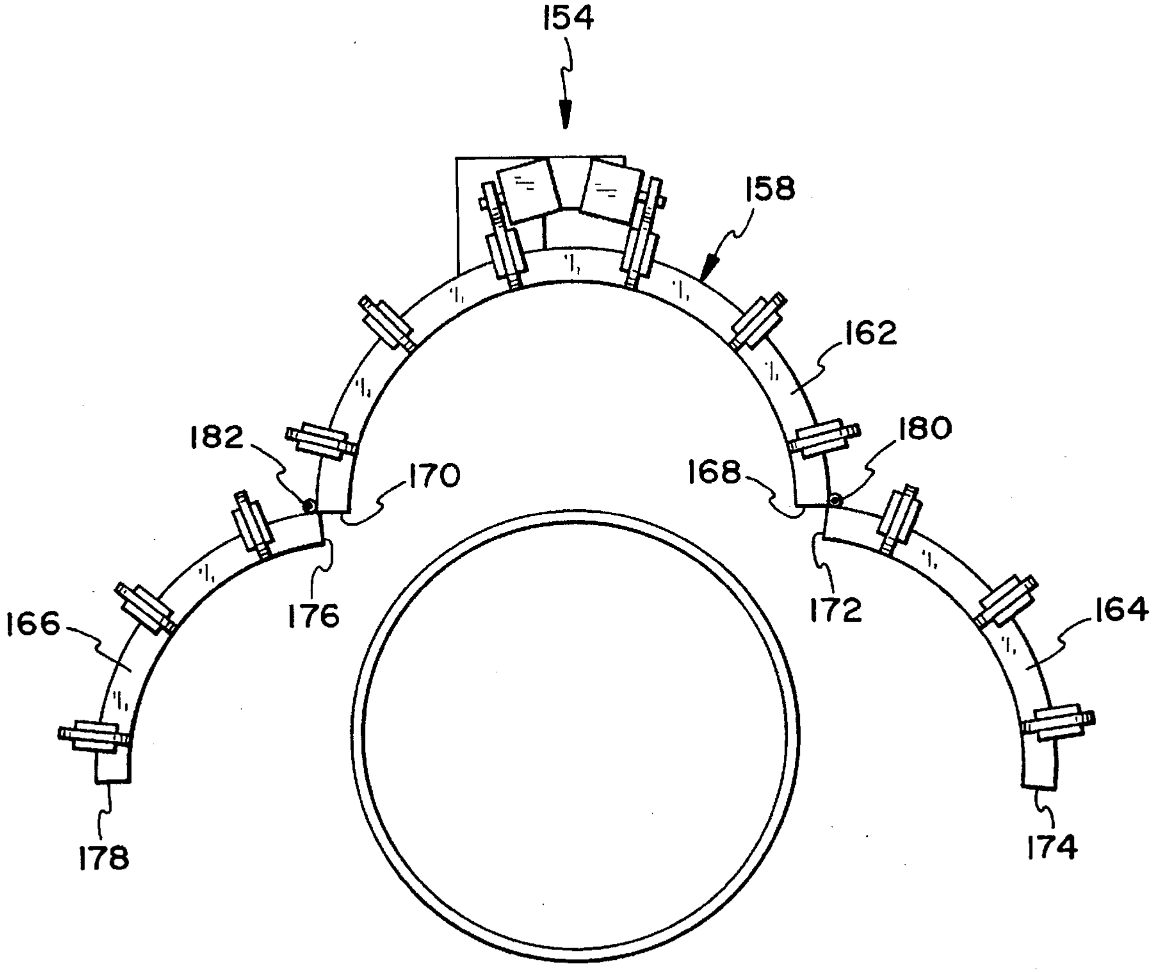
FIG. 14 is a right end elevational view of a defect detection unit formed in accordance with the preferred embodiment of the present invention just prior to mounting on the pipeline.

Referring to FIG. 14, the frame 158 includes three hingedly connected sections 162, 164 and 166. Upper section 162 is mounted about the upper half of the pipeline E and includes ends 168 and 170. Lower sections 162 and 164 are mounted about the lower half of pipeline E. Lower section 164 includes upper end 172 and lower end 174. Similarly, lower section 166 includes upper end 176 and lower end 178. Hinge 180 hingedly connects end 168 of upper section 162 to upper end 172 of section 164. Hinge 182 hingedly connects upper end 176 of section 166 to end 170 of section 162.

Figure 10:
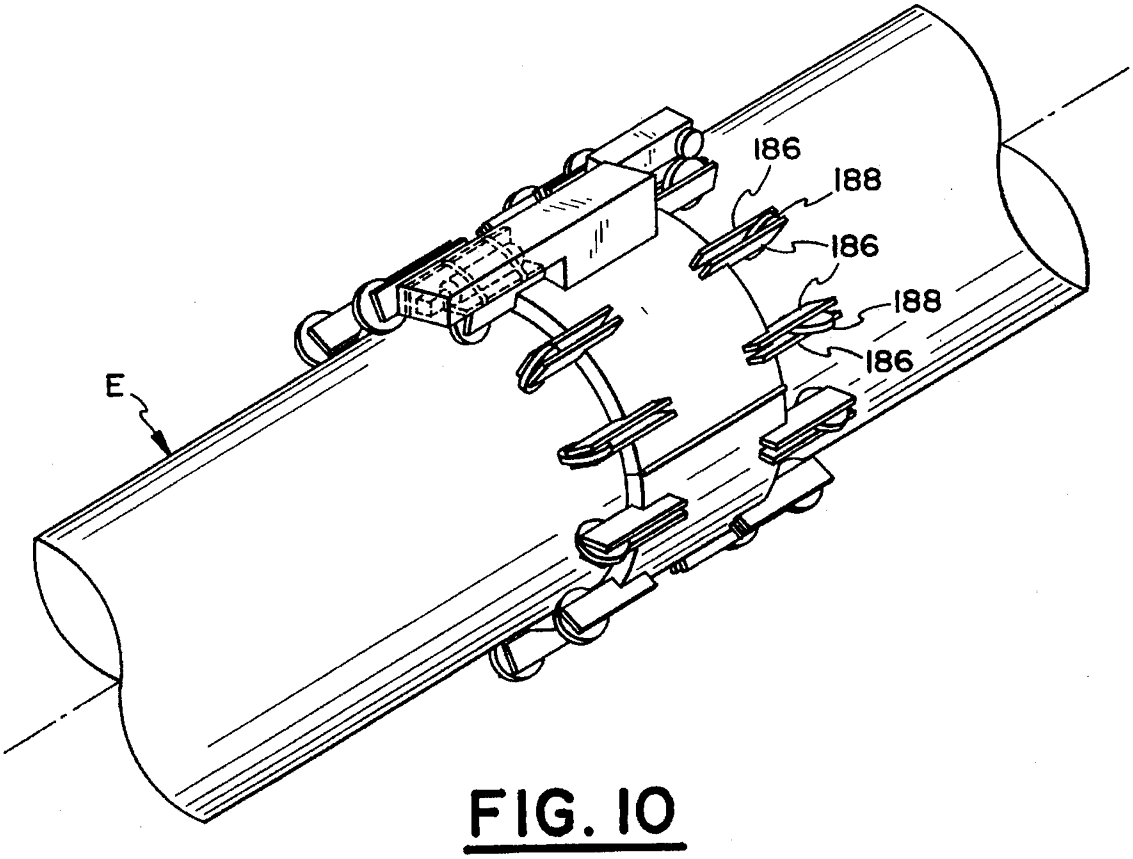
FIG. 10 is a perspective view of one element of a defect detection unit formed in accordance with the preferred embodiment of the present invention.
Figure 12:
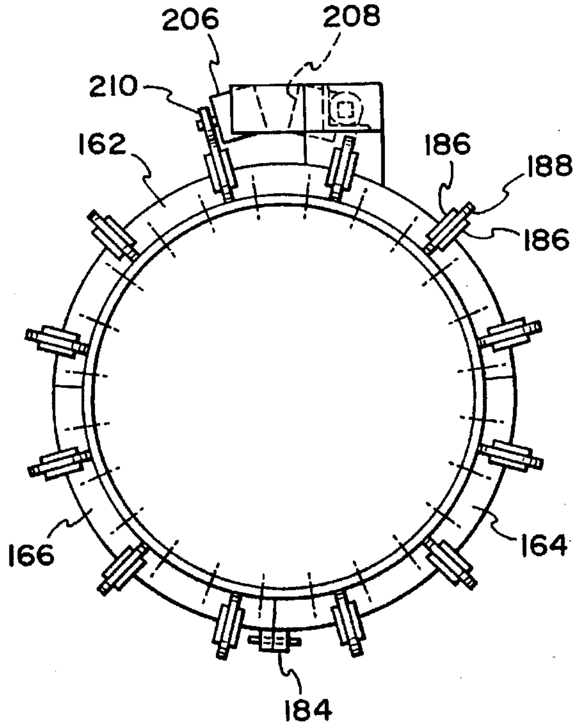
FIG. 12 is a left end view of a defect detection unit formed in accordance with the preferred embodiment of the present invention.
Figure 13:
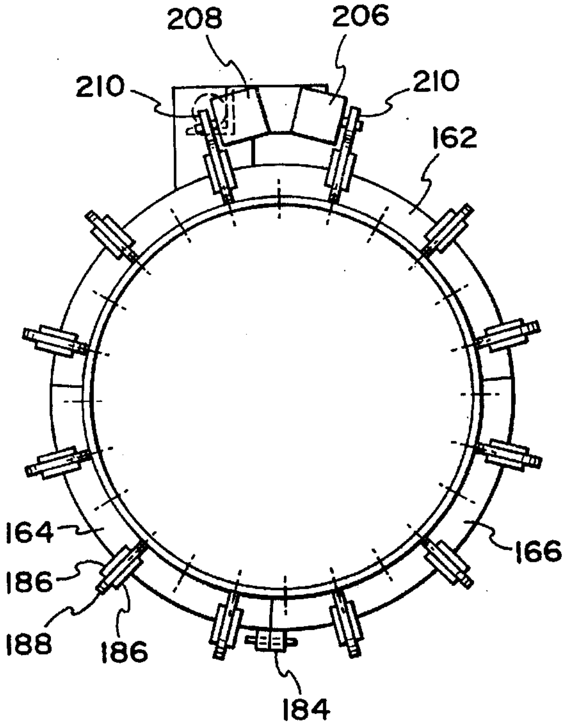
FIG. 13 is a right end view of a defect detection unit formed in accordance with the preferred embodiment of the present invention.

Therefore, it is readily apparent that sections 164 and 166 can be pivoted about hinges 180 and 182, respectively, so that an operator can readily place carriage assembly 154 on or remove the same from pipeline E. As best seen in FIGS. 12 and 13, a conventional latch 184 secures lower end 174 of section 164 to lower end 178 of section 166, once the carriage assembly is properly placed on the pipeline E. Any conventional latch may be used. It should be readily appreciated that the number of sections comprising carrier frame 158 may be varied upwardly or downwardly. As seen in FIGS. 10, 12 and 13, when section 164 is secured to section 166, the carrier assembly 154 entirely encompasses the pipeline E.

A plurality of wheel support arms 186 extend outwardly from frame 158 to support wheels 188. As best seen in FIGS. 9 and 10, a pair of support arms 186 are used to support each wheel 186. Wheels 188 are uniformly spaced along the circumference of carrier frame 158. Wheels 188 movably support the carrier frame 158 on the external surface of the pipeline E. Wheels 188 are arranged such that the inner surface of sections 162, 164 and 166 are spaced an equal distance from the pipeline E.

A plurality of sensors 190 are positioned on the inner surfaces of sections 162, 164 and 166. Most preferably two rings of sensors 192 and 194 are formed, see FIG. 9. The preferred form of sensor is an IGB proximity switch manufactured by IFM Efector, Inc., a subsidiary of IFM Electronic. The sensors 190 are connected in parallel. A conventional power source, preferably located on the tractor carrying the side boom and sling assembly, provides the necessary voltage to the sensors 190. Preferably, 12 V or 24 V DC power source is used. The sensors 190 are also connected to the marking unit 160. The IGB proximity switch is of the inductance type. The proximity switch has an internal monitoring system which compares the measured value (inductance) to the preset value (inductance). The preset value is determined from the distance between the sensors 190 and the exterior surface of the pipeline E without the presence of defects. Thus, as long as the measured value coincides with the preset value no defects are present. Should the measured value deviate from the preset value a defect is present and a signal is sent to the marking unit 160.

It will be readily appreciated that the present invention is not limited to inductance type sensors but includes any conventional type of sensor including but not limited to capacitance type sensors or mechanical sensors.

Figure 11:
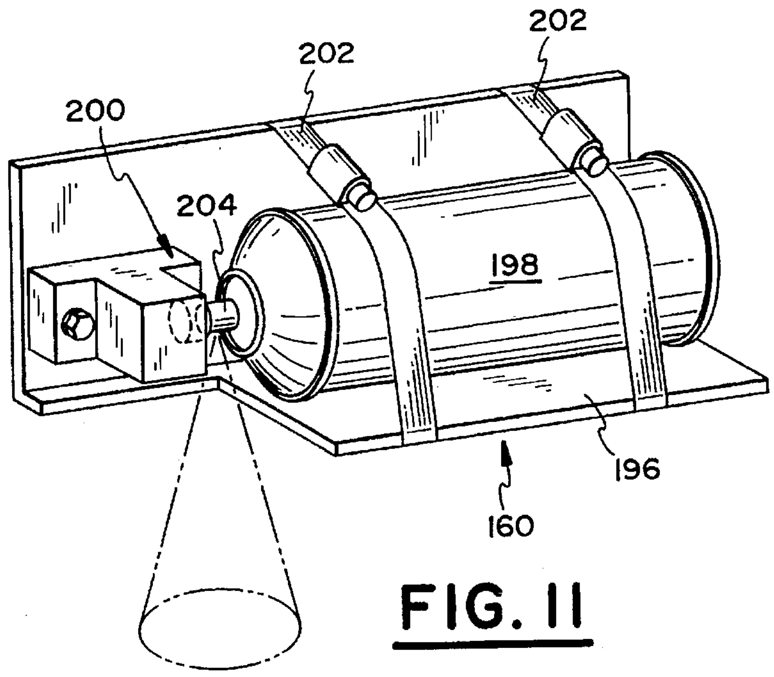
FIG. 11 is a perspective view of the preferred marking unit.

Turning now to marking unit 160. It is readily evident from FIG. 10, that the marking unit 160 is mounted on upper section 162 of carrier frame 158. The details of the marking unit 160 are best seen in FIG. 11. The marking unit 160 includes a mounting bracket 196, a container 198 and a solenoid 200. The container 198 is removably secured to mounting bracket 196 via straps 202. Solenoid 200 is mounted on bracket 196 adjacent discharge nozzle 204 of container 198. Preferably, container 198 is a conventional spray paint container. However, the present invention is not limited to markers which deposit paint. Rather, the present invention includes any type of unit which provides the operator with some form of identifiable indicia indicating the location of a defect.

Once a signal is received from the sensors 190, the solenoid actuates the discharge nozzle and the marking substance is discharged onto the exterior surface of pipeline E. In this manner, the carriage assembly 154 readily identifies to the operating crew the location of any and all defects in the pipeline E.

A pair of drive motors 206 and 208 are mounted on the marking unit 160 directly above wheels 188. Each drive unit includes a drive wheel 210 which engages the corresponding wheel 188. In this manner, the carriage assembly moves along the length of the pipeline E under its own power.

METHOD OF OPERATION

The preferred method of excavating and rehabilitating underground pipelines will now be described with reference to FIG. 1 and 3.

Referring to FIG. 1, the earth surrounding the top and side surfaces of pipeline E is removed by a backhoe. However, it will be readily appreciated that earth removal unit B could be provided with additional excavating members to move the earth from the top and side surfaces of the pipeline E. Subsequently, earth from underneath the pipeline is cleared out over a section approximately the length of the earth removal unit B. This allows the earth removal unit B to be mounted on the pipeline E. The earth removal unit B is then propelled along the pipeline E in the direction of arrow F to remove earth from underneath the pipeline E. Referring to FIG. 3, it will be readily appreciated that excavating members 14, 16 and 18 act together in a tiered manner to remove earth underneath the pipeline E. The excavating members 14, 16 and 18 are positioned in such a manner that the clearance G created between the bottom of pipeline E and the ground is sufficient to allow the coating removal unit C and defect detection unit D to pass freely along pipeline E.

As the earth removal unit B travels a sufficient distance along pipeline E the coating removal unit C and defect detection unit D are mounted about pipeline E successively. These units are then propelled forward to perform their respective functions. Specifically, the coating removal unit C removes the deteriorated coating from pipeline E as well as prepares the exterior surface thereof to receive a new protective coating. The defect detection unit D detects defects in the exterior surface and marks the same so that they may be repaired prior to application of the new coating.

The carriage assemblies 94 and 96 of chain machine 82 and grit blaster 88, respectively, maintain pipeline E in the same vertical position prior to removal of the earth by the unit B. In this manner, the pipeline E is properly supported during the rehabilitation process.

Although not shown, it will be readily appreciated that a coating application unit may follow the defect detection unit D to apply the new protective coating to pipeline E.

While this invention has been described as having a preferred design, it is understood that it is capable of further modifications, uses and/or adaptions of the invention following in general the principle of the invention including such departures from the present disclosure as come within the known or customary practice in the art to which the invention pertains, and as may be applied to the central features set forth and fall within the scope of the invention and the limits of the appended claims.

I claim:

1. A system for excavating and rehabilitating underground pipelines having a protective coating formed thereon; comprising:

a) an earth removal device for removing earth surrounding at least a portion of an underground pipeline having a protective coating thereon, said earth removal device including a housing, an excavating member and at least one wheel, said housing being adapted to fit about an exposed portion of the underground pipeline; and, b) a coating removal device for removing the protective coating from the underground pipeline, said coating removal device including a support member for supporting an endless chain having an endless chain which is positioned about the underground pipeline for removing the coating from the underground pipeline said coating removal device being adapted to be positioned rearwardly of said earth removal device with respect to a direction of travel of said earth removal device.

2. A system as set forth in claim 1, further including:

a) a defect detecting device for detecting defects in the exposed portions of the underground pipeline.

3. A system as set forth in claim 1, wherein:

a) said housing includes adjustment means for adjusting the size of said housing to accommodate various sizes of underground pipelines.

4. A system as set forth in claim 1, wherein:

a) said earth removal device includes a substantially U-shaped protective shroud adapted to be positioned intermediate the pipeline and said excavating member.

5. A system as set forth in claim 1, wherein:

a) said earth removal device includes at least first and second excavating members, said first excavating member is offset from said second excavating member in a vertical direction and a horizontal direction with respect to the underground pipeline.

6. A system as set forth in claim 5, wherein:

a) said first and second excavating members are endless belts having a plurality of cutting members, said first and second excavating members are adapted to be positioned beneath the underground pipeline.

7. A system as set forth in claim 6, wherein:

a) said earth removal device includes a first motor operably associated with said first excavating member for driving said first excavating member in a first direction and a second motor operably associated with said second excavating member for driving said second excavating member in a direction opposite to said first direction.

8. A system for excavating and rehabilitating underground pipelines, comprising:

a) an earth removal device for removing earth surrounding at least a portion of an underground pipeline; and, b) a defect detection device operably associated with said earth removal device for automatically detecting defects in the exterior surface of the underground pipeline, said defect detection device having a sensor for sensing irregularities in the exterior surface of the pipeline by comparing a sensed value with a preset value, said defect detection device further having a marking unit for marking the exterior surface of the pipeline when a surface irregularity is detected, said defect detection device being adapted to be mounted on an exterior surface of an exposed portion of the underground pipeline.

9. A system as set forth in claim 8, further including:

a) a coating removal device for removing a protective coating formed on the underground pipeline, said coating removal device being positioned intermediate said earth removal device and said defect detection device.

10. A system as set forth in claim 8, wherein:

a) said earth removal device includes a housing, an excavating member and at least one wheel, said housing being adapted to fit about an exposed portion of the underground pipeline.

11. A system as set forth in claim 10, wherein:

a) said at least one wheel is operably associated with said housing such that when said housing is fitted about an exposed portion of the underground pipeline said wheel engages the pipeline.

12. A system as set forth in claim 11, wherein:

a) said earth removal device further includes a drive means for driving said earth removal device on and along an exposed portion of the underground pipeline.

13. A system as set forth in claim 10, wherein:

a) said housing includes adjustment means for adjusting the size of said housing to accommodate varying size underground pipelines.

14. A system as set forth in claim 8, wherein:

a) said earth removal device includes a substantially horizontally extending excavating member.

15. A system as set forth in claim 9, wherein:

a) said coating removal device includes at least one chain for removing the protective coating from an underground pipeline.

16. A method for excavating and rehabilitating pipelines having a protective coating formed thereon; comprising the steps of:

a) providing an earth removal device for removing earth surrounding an underground pipeline having a protective coating thereon;

b) providing a coating removal device for removing the protective coating from at least a section of the underground pipeline;

c) providing a defect detection device for detecting surface irregularities in the pipeline;

removing earth surrounding a section of the underground pipeline;

e) positioning the earth removal device about the underground pipeline adjacent the section of the underground pipeline exposed in said removing step;

f) positioning the coating removal device rearwardly of the earth removal device;

g) positioning the defect detection device rearwardly of the coating removal device;

h) moving the earth removal device forward to remove earth surrounding at least a portion of the underground pipeline;

i) moving the coating removal device along the underground pipeline behind said earth removal device to remove the protective coating on the underground pipeline; and moving the defect detection device along the underground pipeline behind the coating removal device to detect surface irregularities in the pipeline.

17. A method as in claim 16, including the further step of:

a) providing the coating removal device with an endless chain completely surrounding the underground pipeline.

18. A method as in claim 16, including the further step of:

a) providing a defect detection device for automatically detecting defects in the exterior surface of the underground pipeline.

19. A system as set forth in claim 1, wherein:

a) said at least one wheel is operably associated with said housing such that when said housing is fitted about an exposed portion of the underground pipeline said wheel engages the pipeline.

20. A system as set forth in claim 1, wherein:

a) said earth removal device further includes a drive means for driving said earth removal device on and along an exposed portion of the underground pipeline.

* * * * *